(12) United States Patent
Eo et al.

(10) Patent No.: US 10,232,700 B2
(45) Date of Patent: Mar. 19, 2019

(54) TRANSMISSION FOR HYBRID VEHICLE

(71) Applicant: Hyundai Motor Company, Seoul (KR)

(72) Inventors: Soon Ki Eo, Whasung-si (KR); Chae Hong Lim, Whasung-si (KR)

(73) Assignee: Hyundai Motor Company, Seoul (KR)

( * ) Notice: Subject to any disclaimer, the term of this patent is extended or adjusted under 35 U.S.C. 154(b) by 371 days.

(21) Appl. No.: 15/341,138

(22) Filed: Nov. 2, 2016

(65) Prior Publication Data

US 2018/0022207 A1 Jan. 25, 2018

(30) Foreign Application Priority Data

Jul. 22, 2016 (KR) .......................... 10-2016-0093052

(51) Int. Cl.
| | |
|---|---|
| *F16H 3/08* | (2006.01) |
| *B60K 6/547* | (2007.10) |
| *B60K 6/36* | (2007.10) |
| *B60K 6/48* | (2007.10) |
| *F16H 3/00* | (2006.01) |
| *F16H 3/091* | (2006.01) |

(Continued)

(52) U.S. Cl.
CPC ............... *B60K 6/547* (2013.01); *B60K 6/36* (2013.01); *B60K 6/48* (2013.01); *F16H 3/006* (2013.01); *F16H 3/091* (2013.01); *F16H 3/10* (2013.01); *F16H 3/12* (2013.01); *B60K 2006/4825* (2013.01); *B60Y 2200/92* (2013.01); *F16H 2003/007* (2013.01); *F16H 2200/0021* (2013.01); *F16H 2200/0043* (2013.01); *Y02T 10/6221* (2013.01); *Y02T 10/6252* (2013.01); *Y10S 903/909* (2013.01); *Y10S 903/919* (2013.01)

(58) Field of Classification Search
CPC ........... F16H 37/021; F16H 2003/0931; F16H 2003/007; F16H 2003/008
USPC .......................... 74/330, 331, 333, 340, 661
See application file for complete search history.

(56) References Cited

U.S. PATENT DOCUMENTS

| 8,590,425 B2 | 11/2013 | Pesola et al. |
|---|---|---|
| 8,733,193 B2 | 5/2014 | Cimatti et al. |
| 9,003,907 B2 | 4/2015 | Weller et al. |

(Continued)

FOREIGN PATENT DOCUMENTS

| JP | 2014-114954 A | 6/2014 |
|---|---|---|
| KR | 10-2012-0055335 A | 5/2012 |

(Continued)

*Primary Examiner* — Ha Dinh Ho
(74) *Attorney, Agent, or Firm* — Morgan, Lewis & Bockius LLP (57) ABSTRACT

A transmission for a hybrid vehicle may include a first input shaft continuously provided with power from an engine, a second input shaft selectively provided with power from the engine via a clutch, a counter shaft coupled to the first input shaft, an output shaft coupled to the second input shaft, a first one-way clutch disposed on a path along which power is transferred from the engine to the output shaft, a motor input shaft provided with power from a motor, a motor-side shift unit comprising a plurality of pairs of gears having different gear ratios, in which one pair of the plurality of pairs of gears suitable to a traveling speed is selected by an engager/disengager, and a second one-way clutch disposed on a path along which power is transferred from the motor to the output shaft.

13 Claims, 3 Drawing Sheets

(51) Int. Cl.
*F16H 3/10* (2006.01)
*F16H 3/12* (2006.01)

(56) References Cited

U.S. PATENT DOCUMENTS

| | | | |
|---|---|---|---|
| 9,020,677 B2 | 4/2015 | Tanaka et al. | |
| 9,670,991 B2* | 6/2017 | Eo | F16H 3/006 |
| 10,100,903 B2* | 10/2018 | Eo | F16H 3/006 |
| 2005/0204842 A1* | 9/2005 | Baldwin | F16H 3/006 |
| | | | 74/331 |
| 2012/0006153 A1 | 1/2012 | Imamura et al. | |
| 2016/0207391 A1 | 7/2016 | Yang et al. | |
| 2016/0223061 A1* | 8/2016 | Park | F16H 3/006 |
| 2016/0298741 A1* | 10/2016 | Eo | F16H 3/006 |

FOREIGN PATENT DOCUMENTS

KR 10-2015-0060061 A 6/2015
KR 10-2016-0038122 A 4/2016

\* cited by examiner

● Operating position for forming current shift position
△ Operating position for forming previous shift position

[Up-Shift]

| Shift Position | CL | SM2&3 | | | SS2&3 | | | SL&H | | | S1-1 | |
|---|---|---|---|---|---|---|---|---|---|---|---|---|
| | | 2nd | N | 3rd | 2nd | N | 3rd | L | N | H | N | L |
| R | – | | ● | | | ● | | ● | | | ● | |
| N | – | | ● | | | ● | | | ● | | ● | |
| 1 | – | | ● | | | ● | | | ● | | ● | ● |
| 2 | ● | ● | | | | ● | | | ● | | ● | △ |
| 3 | ● | △ | | ● | △ | | ● | | ● | | ● | |
| 4~ | – | | ● | △ | | ● | △ | | | ● | ● | |

[Down-Shift]

| Shift Position | CL | SM2&3 | | | SS2&3 | | | SL&H | | | S1-1 | |
|---|---|---|---|---|---|---|---|---|---|---|---|---|
| | | 2nd | N | 3rd | 2nd | N | 3rd | L | N | H | N | L |
| 4~ | – | | ● | | | ● | | | | ● | ● | |
| 3 | ● | | | ● | | | ● | | ● | △ | ● | |
| 2 | ● | ● | | △ | ● | | △ | | ● | | ● | |
| 1 | – | | ● | | | ● | | ● | | | ● | |
| N | – | | ● | | | ● | | | ● | | ● | |
| R | – | | ● | | | ● | | ● | | | ● | |

TRANSMISSION FOR HYBRID VEHICLE

CROSS REFERENCE TO RELATED APPLICATION

The present application claims priority to Korean Patent Application No. 10-2016-0093052, filed Jul. 22, 2016, the entire contents of which is incorporated herein for all purposes by this reference.

BACKGROUND OF THE INVENTION

Field of the Invention

The present invention relates to a transmission for a hybrid vehicle, the transmission improving the fuel efficiency and market competitiveness of the hybrid vehicle by operating a motor in the low-efficiency driving range of an engine.

Description of Related Art

An automated manual transmission provides driving convenience similar to that provided by automatic transmissions by allowing gears to be automatically changed by actuators while a vehicle is traveling. Automated manual transmissions can contribute to improvements in fuel efficiency since the power transmission efficiencies thereof are better than those of automatic transmissions.

Automated manual transmissions include hydraulic actuators used in manual transmissions, whereby a process of changing gears by controlling gears can be automatically performed by a transmission control unit (TCU) instead of being manually performed by a driver.

However, in automated manual transmissions based on a synchromesh shifting mechanism, a moment when the supply of power from an engine is stopped is inevitably present during gear shifting that is automatically performed by the actuator. A resultant decrease in torque leads to a decrease in the sensation of shifting, i.e. a phenomenon in which a driver feels as if a vehicle is pulled backwards.

In this regard, an approach of adding a motor to an engine-powered vehicle was proposed. This approach provides power generated by a motor to an output shaft at a moment when the supply of power from an engine is stopped to overcome the phenomenon of the decrease in torque occurring during shifting.

To improve the fuel efficiency and market competitiveness of a vehicle, it is desirable to enhance the operation of preventing a decrease in the sensation of shifting and increase the frequency of the operation of propelling the vehicle using the motor while the vehicle is traveling. In this regard, it is required to increase the frequency of the operation of the motor in the low-efficiency driving range of the engine.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a transmission for a hybrid vehicle, the transmission improving the fuel efficiency and market competitiveness of the hybrid vehicle by operating a motor in the low-efficiency driving range of an engine.

According to various aspects of the present invention, a transmission for a hybrid vehicle may include a first input shaft continuously provided with power from an engine, a second input shaft selectively provided with power from the engine via a clutch, a counter shaft coupled to the first input shaft via a plurality of pairs of sub-shift gears having different gear ratios, sub-shift gears in each of the pairs of sub-shift gears being meshed with each other, in which one pair of the plurality of pairs of sub-shift gears may be selected by an engager/disengager such that the counter shaft transfers power, an output shaft coupled to the second input shaft via a plurality of pairs of main shift gears having different gear ratios, main shift gears in each of the pairs of main shift gears being meshed with each other, in which one pair of the plurality of pairs of main shift gears may be selected by an engager/disengager such that the output shaft transfers power, a first one-way clutch disposed on a path along which power is transferred from the engine to the output shaft, such that the power is only transferred from the counter shaft in a direction of the output shaft, a motor input shaft provided with power from a motor, a motor-side shift unit including a plurality of pairs of gears having different gear ratios, gears in each of the plurality of pairs of gears being disposed on the motor input shaft and the output shaft and meshed with each other, wherein one pair of the plurality of pairs of gears suitable to a traveling speed is selected by an engager/disengager, and a second one-way clutch disposed on a path along which power is transferred from the motor to the output shaft, such that the power is only transferred from the motor input shaft in a direction of the output shaft.

The first input shaft and the second input shaft may be concentrically disposed, the second input shaft may be a hollow shaft such that the first input shaft is accommodated in the second input shaft, and the clutch may be disposed on one end of the second input shaft that is positioned closer to the engine.

The output shaft may include a first output shaft and a second output shaft, the first input shaft may be disposed in parallel to the counter shaft, such that sub-shift gears in each of the pairs of sub-shift gears are meshed with each other, and the second input shaft may be disposed in parallel to the second output shaft, such that main shift gears in each of the pairs of main shift gears are meshed with each other.

Sub-shift gears in at least one pair of the plurality of pairs of sub-shift gears may have an equal gear ratio and main shift gears in at least one pair of the plurality of pairs of main shift gears may have an equal gear ratio.

The plurality of pairs of sub-shift gears and the plurality of pairs of main shift gears may include pairs of gears other than pairs of lowest gears and pairs of highest gears.

The second output shaft and the counter shaft may be concentrically disposed, and the first one-way clutch may be disposed in a middle of a power transfer path extending from the counter shaft to the first output shaft through the second output shaft.

A power transfer input gear may be disposed on the second output shaft, the first one-way clutch may be disposed between the power transfer input gear and the counter shaft, a power transfer output gear may be disposed on the first output shaft, and a power transfer idling gear may be meshed between the power transfer input gear and the power transfer output gear.

The motor-side shift unit may include a pair of lower gears and a pair of higher gears disposed on the motor input shaft and the first output shaft, gears in each pair of the pair of lower gears and the pair of higher gears being meshed with each other, and the second one-way clutch may be disposed in a middle of a power transfer path extending from the pair of lower gears to the first output shaft.

The transmission may further include a synchronizer selectively engaging an output gear of the pair of lower gears and the first output shaft, in which the second one-way clutch may be disposed between the synchronizer and the first output shaft.

The output shaft and the counter shaft may be concentrically disposed, and the first one-way clutch may be disposed between the counter shaft and the output shaft.

A power transfer member may be disposed on the output shaft, and the first one-way clutch may be disposed between the power transfer member and the counter shaft.

The plurality of pairs of gears of the motor-side gear shift unit may include a pair of lower gears and a pair of higher gears disposed on the motor input shaft and the output shaft, gears in each pair of the pair of lower gears and the pair of higher gears being meshed with each other, and the second one-way clutch may be disposed in a middle of a power transfer path extending from the pair of lower gears to the output shaft.

The transmission may further include a synchronizer selectively engaging an output gear of the pair of lower gears and the output shaft, in which the second one-way clutch may be disposed between the synchronizer and the output shaft.

According to various embodiments of the present invention, it is possible to drive a vehicle using the motor from a stopped state, in a low-speed driving range, or in a high-speed driving range. It is thereby possible to improve the fuel efficiency and market competitiveness of a hybrid vehicle by operating the motor in a low-efficiency driving range of the engine. In addition, at a shifting point of the low-speed driving range when the driving of the motor is converted into the driving of the engine, a change in torque is absorbed to the one-way clutch to remove the sensation of interruption of torque, thereby improving the sensation of shifting.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

A transmission for a hybrid vehicle according to various embodiments of the present invention generally includes a first input shaft IP1, a second input shaft IP2, a counter shaft CNT, an output shaft, a first one-way clutch OWC1, a motor input shaft IPM, a motor-side shift unit, and a second one-way clutch OWC2.

The transmission according to various embodiments of the present invention will be described in detail with reference to FIGS. 1 and 2. The first input shaft IP1 is continuously rotated by power from an engine E.

The second input shaft IP2 can be rotated by power selectively supplied from an engine E in response to selective coupling and decoupling operations of a clutch CL.

For example, the first input shaft IP1 and the second input shaft IP2 may be disposed on eccentric circles, or the second input shaft IP2 may be implemented as a hollow shaft to accommodate the first input shaft IP1 therein.

The clutch CL may be disposed on one end of the second input shaft IP2 that is closer to the engine E than the other end of the second input shaft IP2 is. The engine E is coupled to one end of the first input shaft IP1 directly or via a damper, such that the first input shaft IP1 can be rotated by power from the engine E.

A plurality of pairs of sub-shift gears GS2 and GS3 having different gear ratios are disposed on the counter shaft CNT and the first input shaft IP1 such that sub-shift gears in each pair are meshed with each other. One pair of the pairs of sub-shift gears GS2 and GS3 is selected by an engaging/disengaging unit SS2&3 to transfer power.

For example, one pair of the pairs of sub-shift gears GS2 and GS3 can be selected by the engaging/disengaging unit SS2&3 disposed between the pairs of sub-shift gears GS2 and GS3. The engaging/disengaging unit may be implemented as a device for allowing and disallowing the transmission of power, selected from among, but not limited to, a synchromesh-type synchronizer, a dog clutch, a modified dog clutch, a dry/wet clutch, an electric/electronic dry/wet magnet clutch, a coupling, a fluid clutch, and a spline-based coupling structure.

In addition, a plurality of pairs of main shift gears GM2 and GM3 having different gear ratios are disposed on the output shaft and the second input shaft IP2 such that main shift gears in each pair are meshed with each other. One pair of the pairs of main shift gears GM2 and GM3 is selected by an engaging/disengaging unit SM2&3 to transfer power.

For example, one pair of the pairs of pairs of main shift gears GM2 and GM3 can be selected by the engager/disengager SM2&3 disposed between the pairs of main shift gears GM2 and GM3. The engager/disengager may be implemented as a device for allowing and disallowing the transmission of power, selected from among, but not limited to, a synchromesh-type synchronizer, a dog clutch, a modified dog clutch, a dry/wet clutch, an electric/electronic dry/wet magnet clutch, a coupling, a fluid clutch, and a spline-based coupling structure.

The first one-way clutch OWC1 may be provided on a path along which power is transferred from the engine E to the output shaft, such that power is only transferred from the counter shaft CNT in the direction of the output shaft.

Here, the first one-way clutch OWC1 for mechanically allowing and disallowing the transmission of power may be implemented as one selected from, but is not limited to, a mechanical device operating in the same principle as described above, a part operating using hydraulic force, a device having a fluid-machine composite structure, a device using electric/electronic force, and so on.

The motor input shaft IPM is able to rotate using power supplied from the motor M. The motor input shaft IPM is disposed in parallel to the output shaft. One end of the motor input shaft IPM can be directly connected to the motor M.

The motor-side shift unit includes a plurality of pairs of gears having different gear ratios, each pair including gears disposed on the motor input shaft IPM and the output shaft to be meshed with each other, such that a pair of gears appropriate to a driving speed can be selected by an engager/disengager SL&H.

For example, one pair of the plurality of pairs of gears can be selected by the engager/disengager SL&H. The engager/disengager SL&H may be implemented as a device for allowing and disallowing the transmission of power, selected from among, but not limited to, a synchromesh-type synchronizer, a dog clutch, a modified dog clutch, a dry/wet clutch, an electric/electronic dry/wet magnet clutch, a coupling, a fluid clutch, and a spline-based coupling structure.

The second one-way clutch OWC2 may be provided on a path along which power is transferred from the motor M to the output shaft, such that power is only transferred from the motor input shaft IPM in the direction of the output shaft.

Here, the second one-way clutch OWC2 for mechanically allowing and disallowing the transmission of power may be implemented as one selected from, but is not limited to, a mechanical device operating in the same principle as described above, a part operating using hydraulic force, a device having a fluid-machine composite structure, a device using electric/electronic force, and so on.

According to the configuration as set forth above, it is possible to drive a vehicle using the motor M from a stopped state, in a low-speed driving range, or in a high-speed driving range. It is thereby possible to improve the fuel efficiency and market competitiveness of a hybrid vehicle by operating the motor M in a low-efficiency driving range of the engine E.

In addition, it is possible to remove the sensation of interruption of torque by absorbing a change in torque using the first one-way clutch OWC1 and the second one-way clutch OWC2, thereby improving the sensation of shifting.

Figure 1:
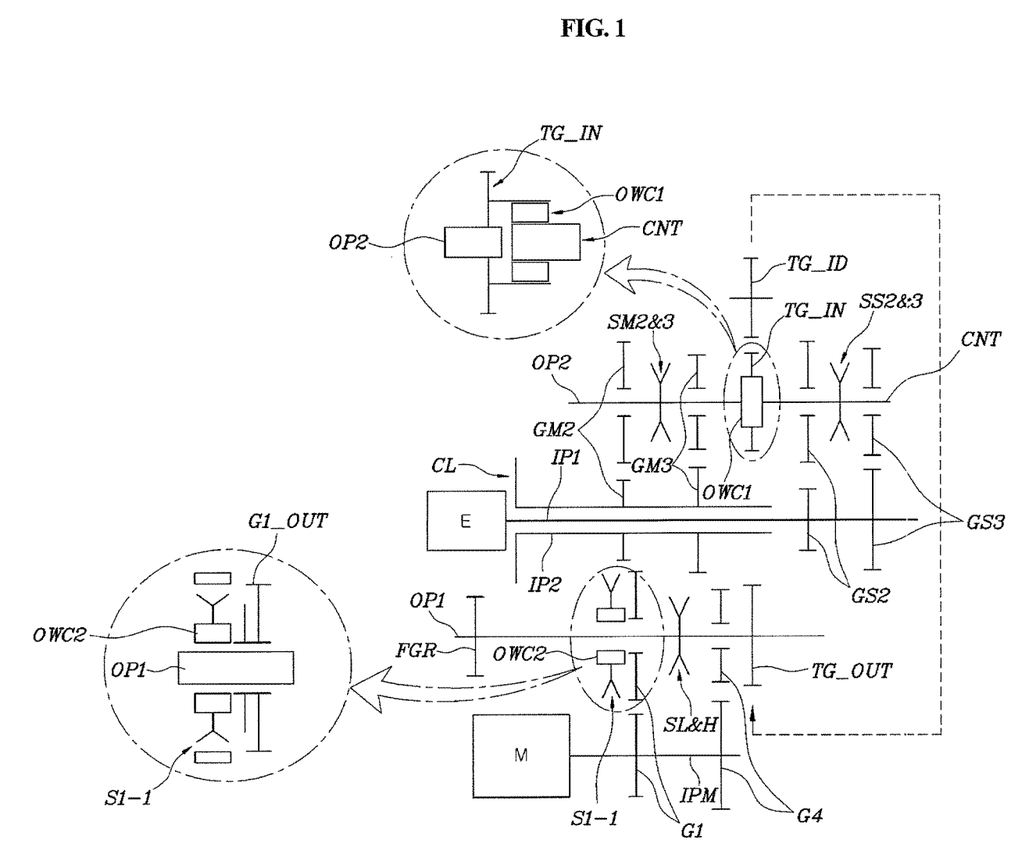
FIG. 1 illustrates the configuration of a transmission for a hybrid vehicle according to various embodiments of the present invention.

FIG. 1 illustrates the configuration of a transmission for a hybrid vehicle according to various embodiments of the present invention, in which the output shaft OP includes a first output shaft OP1 and a second output shaft OP2.

For example, the first input shaft IP1 is disposed in parallel to the counter shaft CNT, such that the plurality of pairs of sub-shift gears GS2 and GS3 can be respectively coupled to the first input shaft IP1 and the counter shaft CNT, with sub-shift gears in each pair being meshed with other.

In addition, the second input shaft IP2 is disposed in parallel to the second output shaft OP2, such that the plurality of pairs of sub-shift gears GS2 and GS3 can be respectively coupled to the second input shaft IP2 and the second output shaft OP2, with sub-shift gears of each pair being meshed with other.

In particular, the pairs of sub-shift gears GS2 and GS3 and the pairs of main shift gears GM2 and GM3 are configured such that at least one pair of the sub-shift gears GS2 and GS3 has the same gear ratio and at least one pair of the main shift gears GM2 and GM3 has the same gear ratio.

Specifically, when a pair of sub-shift gears GS2 having a second gear ratio and a pair of sub-shift gears GS3 having a third gear ratio are provided, a pair of main shift gears GM2 having a second gear ratio and a pair of main shift gears GM3 having a third gear ratio may be provided.

In addition, the pairs of sub-shift gears GS2 and GS3 and the pairs of main shift gears GM2 and GM3 may be pairs of gears other than pairs of lowest gears and pairs of highest gears.

For example, according to various embodiments of the invention, pairs of second gears and pairs of third gears may be provided as the pairs of sub-shift gears GS2 and GS3 and the pairs of main shift gears GM2 and GM3. The second/third sub-shift gears engager/disengager SS2&3 is provided between the pair of second sub-shift gears GS2 and the pair of third sub-shift gears GS3 to select one of the two pairs of sub-shift gears GS2 and GS3 can be selected using. The second/third main shift gears engager/disengager SM2&3 is provided between the pair of second main shift gears GM2 and the pair of third main shift gears GM3 to select one of the two pairs of main shift gears GM2 and GM3.

According to various embodiments, a following reduction gear FGR connected to a differential is disposed on the first output shaft OP1.

In addition, the second output shaft OP2 and the counter shaft CNT are concentrically disposed to face each other. The first one-way clutch OWC1 is disposed in the middle of a power transfer path extending from the counter shaft CNT to the first output shaft OP1 through the second output shaft OP2. Thus, a configuration for transferring power from the counter shaft CNT to the first output shaft OP1 may be further provided.

For example, a power transfer input gear TG_IN is disposed on one end of the second output shaft OP2, and a first one-way clutch OWC1 is disposed between the power transfer input gear TG_IN and the counter shaft CNT. In addition, a power transfer output gear TG_OUT is disposed on the first output shaft OP1, and a power transfer idling gear TG_ID is meshed between the power transfer input gear TG_IN and the power transfer output gear TG_OUT.

Specifically, driving force from the engine E to be supplied to the counter shaft CNT is transferred to the power transfer idling gear TG_ID. Then, the driving force is transferred to the differential through the power transfer idling gear TG_ID and the power transfer output gear TG_OUT and then through the following reduction gear FGR disposed on the first output shaft OP1. When the speed of rotation of the counter shaft CNT is faster than the speed of rotation of the power transfer idling gear TG_ID, the first one-way clutch OWC1 absorbs the difference in the speed between the counter shaft CNT and the power transfer idling gear TG_ID, whereby the relative rotation of the counter shaft CNT is enabled.

Referring to FIG. 1, the motor-side shift unit includes a pair of lower gears G1 and a pair of higher gears G4.

For example, the pair of lower gears G1 and the pair of higher gears G4 are disposed on the motor input shaft IPM and the first output shaft OP1 such that gears in each pair are meshed with other.

Here, the motor-side engager/disengager SL&H is provided between an output gear G1_OUT provided in the pair of lower gears G1 and an output gear G4_OUT provided in the pair of higher gears G4. The pair of lower gears G1 may be a pair of first gears, while the pair of higher gears G4 may be a pair of fourth gears. The motor-side engager/disengager SL&H may be a first/fourth gears engager/disengager.

In addition, the pair of higher gears G4 may be used as a pair of power-generating gears, in which the motor M can function as a generator. Although the motor M may be a motor generator able to perform both a rotating function unique to the motor and a generator function, the term "motor" is used herein for the sake of clarity and conciseness.

The second one-way clutch OWC2 is disposed in the middle of a power transfer path extending from the pair of lower gears G1 to the first output shaft OP1.

For example, a synchronization unit S1-1 allowing the output gear G1_OUT of the pair of lower gears G1 to be selectively coupled to the first output shaft OP1 is provided. In this regard, the second one-way clutch OWC2 is disposed between the synchronization unit S1-1 and the first output shaft OP1.

That is, the output gear G1_OUT of the pair of lower gears G1 can be coupled to the first output shaft OP1 via the synchronization unit S1-1.

Figure 2:
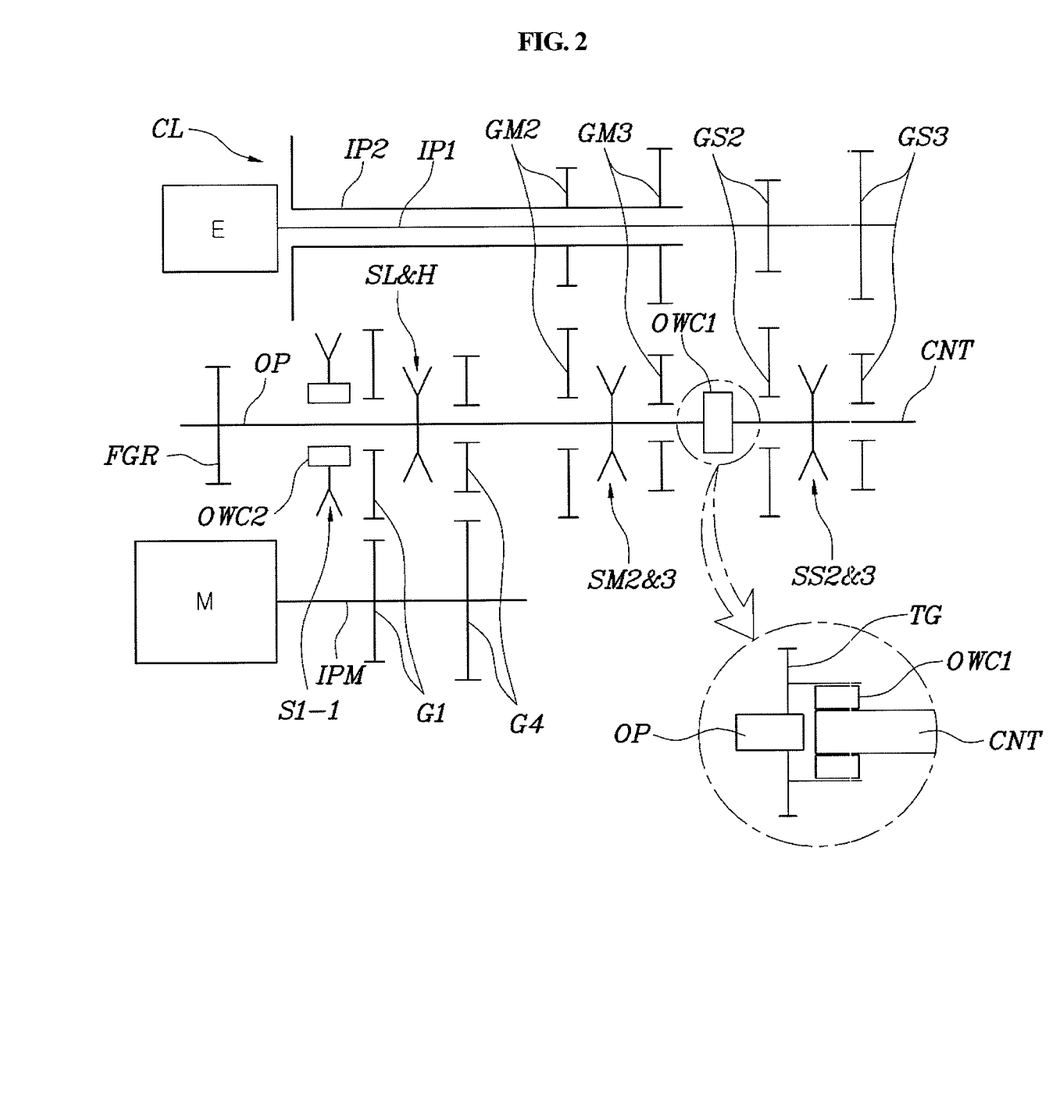
FIG. 2 illustrates the configuration of a transmission for a hybrid vehicle according to various embodiments of the present invention.

In addition, FIG. 2 illustrates the configuration of a transmission for a hybrid vehicle according to various embodiments of the present invention. The first input shaft IP1 is disposed in parallel to the counter shaft CNT, such that the plurality of pairs of sub-shift gears GS2 and GS3 are coupled to the first input shaft IP1 and the counter shaft CNT, with sub-shift gears in each pair being meshed with each other.

In addition, the second input shaft IP2 is disposed in parallel to the output shaft OP, such that the plurality of pairs of main shift gears GM2 and GM3 are coupled to the second input shaft IP2 and the output shaft OP, with main shift gears in each pair being meshed with other.

Furthermore, the following reduction gear FGR connected to a differential is disposed on the output shaft OP.

The output shaft OP and the counter shaft CNT are concentrically disposed to face each other. The first one-way clutch OWC1 is disposed in the middle of a power transfer path extending from the counter shaft CNT to the output shaft OP.

For example, a power transfer member TG is disposed on one end of the output shaft OP, and the first one-way clutch OWC1 is disposed between the power transfer member TG and the counter shaft CNT. The power transfer member TG may be in the shape of a gear.

Power to be supplied to the counter shaft CNT from the engine E is transferred to the power transfer member TG through the first one-way clutch OWC1. The power can be transferred to the differential through the following reduction gear FGR disposed on the output shaft OP. At this time, when the speed of rotation of the counter shaft CNT is faster than the speed of rotation of the power transfer member TG, the first one-way clutch OWC1 absorbs the difference in the speed between the counter shaft CNT and the power transfer member TG, whereby the relative rotation of the counter shaft CNT is enabled.

Referring to FIG. 2, the motor-side shift unit includes the pair of lower gears G1 and the pair of higher gears G4.

For example, the pair of lower gears G1 and the pair of higher gears G4 are disposed on the motor input shaft IPM and the first output shaft OP1 such that gears in each pair are meshed with other.

Here, the motor-side engager/disengager SL&H is provided between the output gear G1_OUT provided in the pair of lower gears G1 and the output gear G4_OUT provided in the pair of higher gears G4. The pair of lower gears G1 may be a pair of first gears, while the pair of higher gears G4 may be a pair of fourth gears. The motor-side engager/disengager SL&H may be a first/fourth gears engager/disengager.

The second one-way clutch OWC2 is disposed in the middle of a power transfer path extending from the pair of lower gears G1 to the output shaft OP.

For example, a synchronization unit S1-1 allowing the output gear G1_OUT of the pair of lower gears G1 to be selectively coupled to the output shaft OP is provided. In this regard, the second one-way clutch OWC2 is disposed between the synchronization unit S1-1 and the output shaft OP.

That is, the output gear G1_OUT of the pair of lower gears G1 can be coupled to the output shaft OP via the synchronization unit S1-1.

Hereinafter, a description will be made to shifting operations at specific shifting points using the transmission according to various embodiments of the present invention.

Figure 3:
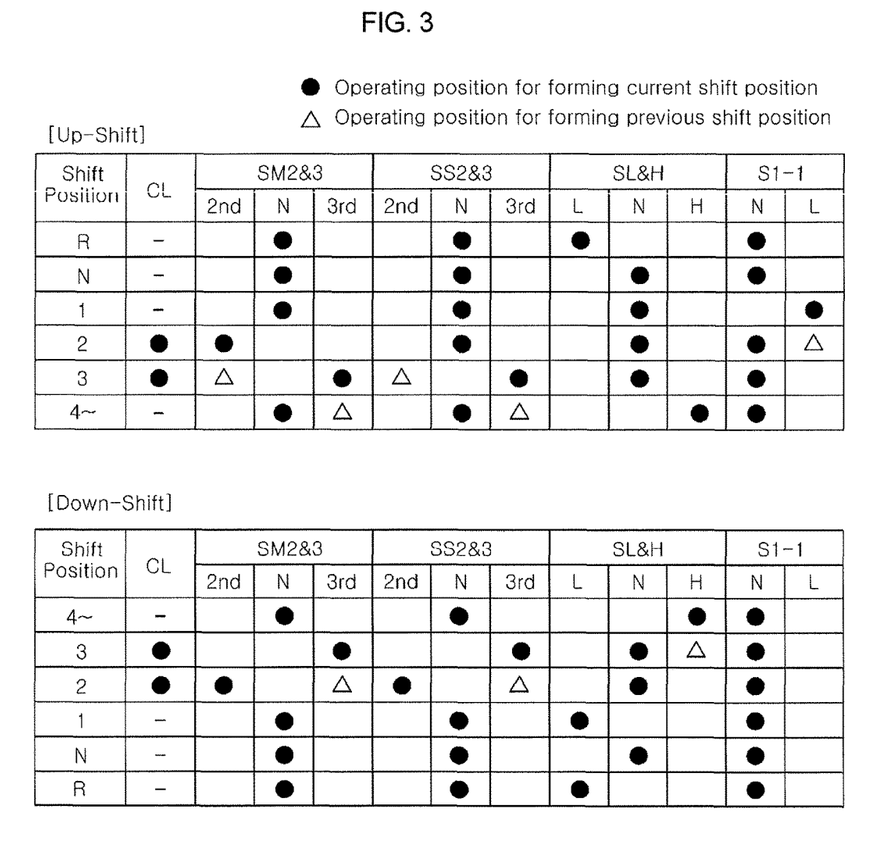
FIG. 3 is a table representing shifting operations at respective shift positions in the case of upshifting and downshifting using the transmission according to various embodiments of the present invention.

Referring to FIGS. 1 to 3, when a vehicle is operating in a first shift position, the synchronization unit S1-1 in which the first one-way clutch OWC1 is disposed is operated to select the output gear G1_OUT of the pair of lower gears G1.

When the motor M is operated in this state, the first one-way clutch OWC1 causes the output gear G1_OUT of the pair of lower gears G1 to rotate while pulling the first output shaft OP1, such that the vehicle can travel in the first shift position using the driving force of the motor M.

Afterwards, in the case upshifting from a first shift position to a second shift position, the pair of second main shift gears GM2 is selected using the second/third main shift gears engager/disengager SM2&3, and then the clutch CL is converted into the engaged position, whereby the vehicle can travel in the second shift position using driving force from the engine E. At the moment when the clutch CL is converted into the engaged position, the speed of rotation of the engine transferred, at the gear ratio of the pair of second main shift gears GM2, to the second output shaft OP2 is faster than the speed of rotation of the output gear G1_OUT of the pair of lower gears G1. The second one-way clutch OWC2 absorbs the difference in the speed, thereby preventing interlocking.

In addition, in the case upshifting from the second shift position to a third shift position, the pair of second sub-shift gears GS2 is selected using the second/third sub-shift gears engager/disengager SS2&3. Here, the gear ratio of the pair of second main shift gears GM2 is equal to the gear ratio of the pair of second sub-shift gears GS2, such that rotation can be transferred without interlocking.

Afterwards, the clutch CL is converted into the disengaged position, and the second/third main shift gears engager/disengager SM2&3 is converted into the disengaged position, selectively from the pair of second main shift gears GM2. Even in the case in which the clutch CL and the second/third main shift gears engager/disengager SM2&3 are converted into disengaged positions, the driving force of the engine E is still being transferred through the pair of second sub-shift gears GS2. In particular, the counter shaft CNT is caused to rotate through the first one-way clutch OWC1 while pulling the power transfer idling gear TG_ID, whereby the vehicle can remain traveling in the second shift position using the driving force of the engine E.

Subsequently, the pair of third main shift gears GM3 is selected using the second/third main shift gears engager/disengager SM2&3, and the clutch is converted into the engaged position, whereby the vehicle can travel in the third shift position using the driving force of the engine E.

In particular, at a moment when the clutch CL is converted into the engaged position, the speed of rotation transferred, at the gear ratio of the pair of third main shift gears GM3, to the power transfer idling gear TG_ID is faster than the speed of rotation transferred, at the gear ratio of the pair of second sub-shift gears GS2, to the counter shaft CNT. The first one-way clutch OWC1 absorbs the difference in the speed, thereby preventing interlocking.

Afterwards, the pair of third sub-shift gears GS3 is selected and engaged using the second/third sub-shift gears engager/disengager SS2&3. At this time, the gear ratio of the pair of third main shift gears GM3 is equal to the gear ratio of the pair of third sub-shift gears GS3, such that rotation can be transferred without interlocking.

In the case upshifting from the third shift position to a fourth shift position, the speed of rotation of the motor M is set to the speed of rotation transferred, at the gear ratio of the pair of third sub-shift gears GS3, to the first output shaft OP1, and then a pair of higher gears is selected using the first/fourth gears engager/disengager SL&H. Afterwards, the motor M is controlled while the clutch CL is being converted into the disengaged position, whereby the vehicle can travel in the fourth or higher shift position using the driving force of the motor M.

During traveling in the fourth or higher shift position, both the second/third main shift gears engager/disengager SM2&3 and the second/third sub-shift gears engager/disengager SS2&3 are controlled to be converted into the disengaged positions.

In the case of downshifting from the fourth shift position to the third shift position, the pair of third main shift gears GM3 is selected using the second/third main shift gears engager/disengager SM2&3, and the speed of rotation of the motor M is set to the speed of rotation of the engine transferred, at the gear ratio of the pair of third main shift gears GM3, to the first output shaft OP1. Afterwards, the clutch CL is converted into the engaged position while the first/fourth gears engager/disengager SL&H is being disengaged from the pair of higher gears G4, whereby the vehicle can travel in the third shift position using the driving force of the engine E. The pair of third sub-shift gears GS3 can be selected using the second/third sub-shift gears engager/disengager SS2&3.

In addition, in the case of downshifting from the third shift position to the second shift position, shifting is performed using a single clutch. Specifically, the clutch is converted into the disengaged position, and then the second/third main shift gears engager/disengager SM2&3 and the second/third sub-shift gears engager/disengager SS2&3 are disengaged from the pair of third main shift gears GM3 and the pair of third sub-shift gears GS3. After the second/third main shift gears engager/disengager SM2&3 and the second/third sub-shift gears engager/disengager SS2&3 are engaged with the pair of second main shift gears GM2 and the pair of second sub-shift gears GS2, the clutch CL is converted into the engaged position, thereby forming the second shift position. Consequently, the vehicle can travel in the second shift position.

Subsequently, in the case of downshifting from the second shift position to the first shift position, the speed of rotation of the motor M is set to the speed of rotation of the engine transferred, at the gear ratio of the pair of second gears G2, to the first output shaft OP1, and the pair of lower gears G1 is selected using the first/fourth gears engager/disengager SL&H. Afterwards, the operation of the motor M is controlled while the clutch CL is being converted into the disengaged position, whereby the vehicle can travel in the first shift position.

Hereinafter, a reason why the pair of lower gears G1 is selected using the first/fourth gears engager/disengager SL&H will be described. When the pair of lower gears G1 is selected using the synchronization unit S1-1, the first output shaft OP1 rotates faster than the output gear G1_OUT of the pair of lower gears G1 due to the traveling characteristics of downshifting from the second shift position to the first shift position. Then, the second one-way clutch OWC2 absorbs the difference in the speed. Consequently, the driving force from the motor M is not transferred to the first output shaft OP1, i.e. the supply of power is stopped.

In this regard, according to various embodiments of the present invention, the pair of lower gears G1 is selected using the first/fourth gears engager/disengager SL&H, such that the deceleration of the first output shaft OP1 can be controlled by controlling the motor M. It is therefore possible to rapidly decelerate the vehicle according to the first gear ratio.

According to various embodiments of the present invention as set forth above, it is possible to drive a vehicle using the motor M from a stopped state, in a low-speed driving range, or in a high-speed driving range. It is thereby possible to improve the fuel efficiency and market competitiveness of a hybrid vehicle using the motor M in a low-efficiency driving range of the engine E. In addition, at a shifting point of the low-speed driving range, a change in torque is absorbed to the first one-way clutch OWC1 or the second one-way clutch OWC2 to remove the sensation of interruption of torque, thereby improving the sensation of shifting.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A transmission for a hybrid vehicle, the transmission comprising:
   a first input shaft continuously provided with power from an engine;
   a second input shaft selectively provided with power from the engine via a clutch;
   a counter shaft coupled to the first input shaft via a plurality of pairs of sub-shift gears having different gear ratios, sub-shift gears in each of the pairs of sub-shift gears being meshed with each other, wherein one pair of the plurality of pairs of sub-shift gears is selected by an engager/disengager such that the counter shaft transfers power;
   an output shaft coupled to the second input shaft via a plurality of pairs of main shift gears having different gear ratios, main shift gears in each of the pairs of main shift gears being meshed with each other, wherein one pair of the plurality of pairs of main shift gears is selected by an engager/disengager such that the output shaft transfers power;
   a first one-way clutch disposed on a path along which power is transferred from the engine to the output shaft, such that the power is only transferred from the counter shaft in a direction of the output shaft;
   a motor input shaft provided with power from a motor;
   a motor-side shift unit comprising a plurality of pairs of gears having different gear ratios, gears in each of the plurality of pairs of gears being disposed on the motor input shaft and the output shaft and meshed with each other, wherein one pair of the plurality of pairs of gears suitable to a traveling speed is selected by an engager/disengager; and
   a second one-way clutch disposed on a path along which power is transferred from the motor to the output shaft, such that the power is only transferred from the motor input shaft in a direction of the output shaft.

2. The transmission according to claim 1, wherein
   the first input shaft and the second input shaft are concentrically disposed;
   the second input shaft comprises a hollow shaft such that the first input shaft is accommodated in the second input shaft; and
   the clutch is disposed on a first end of the second input shaft that is positioned closer to the engine.

3. The transmission according to claim 1, wherein
   the output shaft comprises a first output shaft and a second output shaft;
   the first input shaft is disposed in parallel to the counter shaft, such that sub-shift gears in each of the pairs of sub-shift gears are meshed with each other; and
   the second input shaft is disposed in parallel to the second output shaft, such that main shift gears in each of the pairs of main shift gears are meshed with each other.

4. The transmission according to claim 1, wherein sub-shift gears in at least one pair of the plurality of pairs of sub-shift gears have an equal gear ratio and main shift gears in at least one pair of the plurality of pairs of main shift gears have an equal gear ratio.

5. The transmission according to claim 4, wherein the plurality of pairs of sub-shift gears and the plurality of pairs of main shift gears comprise pairs of gears other than pairs of lowest gears and pairs of highest gears.

6. The transmission according to claim 1, wherein
   the second output shaft and the counter shaft are concentrically disposed; and
   the first one-way clutch is disposed in a middle of a power transfer path extending from the counter shaft to the first output shaft through the second output shaft.

7. The transmission according to claim 6, wherein
   a power transfer input gear is disposed on the second output shaft;
   the first one-way clutch is disposed between the power transfer input gear and the counter shaft;
   a power transfer output gear is disposed on the first output shaft; and
   a power transfer idling gear is meshed between the power transfer input gear and the power transfer output gear.

8. The transmission according to claim 3, wherein
   the motor-side shift unit comprises a pair of lower gears and a pair of higher gears disposed on the motor input shaft and the first output shaft, gears in each pair of the pair of lower gears and the pair of higher gears being meshed with each other; and
   the second one-way clutch is disposed in a middle of a power transfer path extending from the pair of lower gears to the first output shaft.

9. The transmission according to claim 8, further comprising a synchronizer selectively engaging an output gear of the pair of lower gears and the first output shaft,
   wherein the second one-way clutch is disposed between the synchronizer and the first output shaft.

10. The transmission according to claim 1, wherein
    the output shaft and the counter shaft are concentrically disposed; and
    the first one-way clutch is disposed between the counter shaft and the output shaft.

11. The transmission according to claim 10, wherein
    a power transfer member is disposed on the output shaft; and
    the first one-way clutch is disposed between the power transfer member and the counter shaft.

12. The transmission according to claim 1, wherein the plurality of pairs of gears of the motor-side gear shift unit comprises a pair of lower gears and a pair of higher gears disposed on the motor input shaft and the output shaft, gears in each pair of the pair of lower gears and the pair of higher gears being meshed with each other, and
    the second one-way clutch is disposed in a middle of a power transfer path extending from the pair of lower gears to the output shaft.

13. The transmission according to claim 12, further comprising a synchronizer selectively engaging an output gear of the pair of lower gears and the output shaft, wherein the second one-way clutch is disposed between the synchronizer and the output shaft.

* * * * *